Jan. 7, 1969   B. P. RICE   3,420,190
RAILCAR WHEEL STOP
Filed Feb. 17, 1967
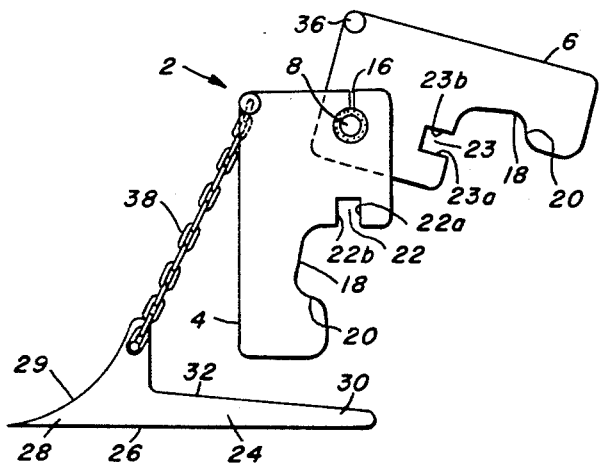
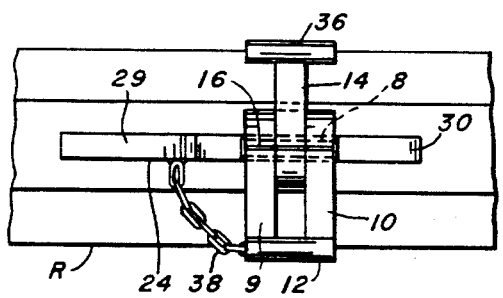
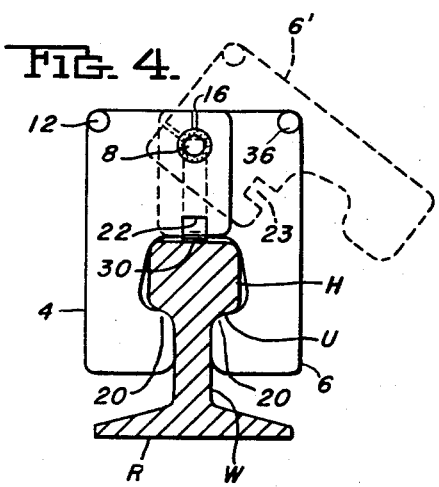
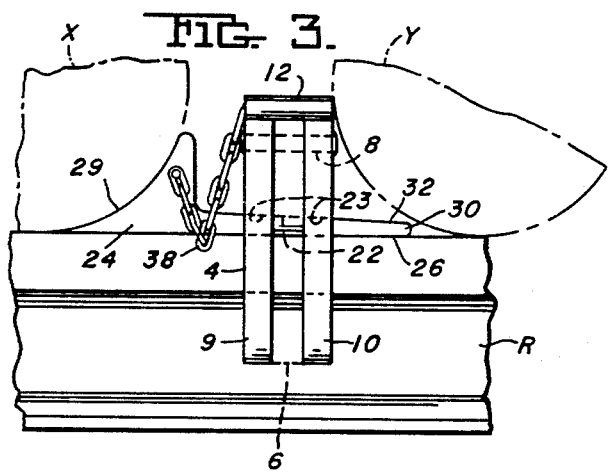
INVENTOR.
BUFORD P. RICE
By Donald G. Dalton
Attorney

United States Patent Office 3,420,190
Patented Jan. 7, 1969

3,420,190
RAILCAR WHEEL STOP
Buford P. Rice, 2207 E. 73rd Ave.,
Crown Point, Ind. 46307
Filed Feb. 17, 1967, Ser. No. 616,921
U.S. Cl. 104—258   4 Claims
Int. Cl. B61k 7/04

ABSTRACT OF THE DISCLOSURE

A railcar wheel stop having two plates rotatably connected together by a hinge means. The plates each have a concave recess into which the head of the rail fits, and there are flange portions extending into the concave recesses designed to engage the underside of the railhead on opposite sides of the web of the rail. At the portion of each recess that is designed to fit over the top of the railhead is located a passageway or slot, and the slots of all the plates align to form a continuous passageway when the edge portions of the concave recesses engage the railhead. A wedge member forced into this continuous passageway secures the plates to the rail and provides an effective stop for railcar wheels.

---

This invention relates to railcar wheel stops that can be removably attached to the head of a rail. Such stops are usually of light weight and are used on railroad rails and steel mill crane rails where heavier, permanent bumping posts are not required.

Known stops of this type have included various clamp and wedge combinations, wherein a wedge-shaped member is used to secure two clamping members to the railhead. U.S. Patent No. 2,807,220 to McDowell shows two clamp members on either side of a railhead which are bolted together and have a concave edge surface for engagement with a railcar wheel. The clamp members have flanges which engage the underside of the railhead when a wedge member is forced into an opening between the top of the railhead and the clamp members. When a railcar wheel strikes the clamp members on their concave surfaces, the clamp members become wedged more tightly to the railhead.

A similar rail stop is shown in U.S. Patent No. 2,280,421 to Merritt. The same bolted clamp members are used, but the means having the concave surface for stopping the car wheel is a part of the wedge member instead of the clamp members. The stops of both of the foregoing patents have the disadvantage of being effective to stop only car wheels coming from one direction. If either stop were hit from the side opposite its concave wheel engaging surface, it would be loosened from the railhead.

The railcar stop shown in U.S. Patent No. 1,096,121 is a stop of greater weight and size than those shown in the two above-mentioned patents. It includes two massive clamp members engaging opposite sides of the railhead. A pin extends laterally through the clamp members and a wedge member is driven through a hole in the pin adjacent one of the clamp members to squeeze the clamp members to the railhead. This type of stop, when first put in place, is equally effective to stop wheels approaching from either side, but repeated wheel blows on this stop will tend to loosen the wedge member and render the stop equally ineffective to stop wheels on either side.

A disadvantage of all of these wheel stops is that they include a number of parts which must be taken apart and completely separated from one another when the stop is removed from the railhead. These parts must be gathered together and reassembled when the stop is to be used again, a time-consuming nuisance if the wheel stop must be repeatedly removed and put back. Another disadvantage with these known wheel stops is that many of their parts must be cast in special molds, rather than simply being cut from standard plates or bar stock. This of course makes the stops more expensive than they otherwise might be.

An object of my invention is to provide a railcar wheel stop for attachment to a railhead that will remain tightened to the railhead after repeated blows from either direction along the rail, and yet will be easily removable from the rail.

Another object is to provide a wheel stop having parts that need not be completely separated from one another when the stop is removed from the railhead.

Still another object is to provide a wheel stop that is of a light weight, simple, economical construction and has main body and wedging members that can be made from ordinary boiler plate and bar stock.

These and other objects will appear more readily from the following detailed description of my invention and the attached drawings in which:

FIGURE 1 is a side view of a railroad wheel stop, prior to its being attached to a railhead;

FIGURES 2, 3, and 4 are top, side and front views respectively of the wheel stop of FIGURE 1 secured to a railhead.

Referring to FIGURE 1, railcar stop 2 includes two body members 4 and 6 which are rotatably connected together by a hinge pin 8. In my preferred embodiment, the body member 4 is made of two plates 9 and 10 (FIGURE 2) held together in parallel alignment by means of a short, round bar 12. The body member 6 is made of a single plate 14 which rotates about hinge pin 8 between the plates 9 and 10. The hinge pin 8 is fixed to plates 9 and 10 by squeezing together the vertical walls of slots 16 in the plates 9 and 10, and then welding the ends of pin 8 to the exterior surfaces of these plates.

All three plates 9, 10, and 14 may be cut from standard boiler plate, using the same pattern. Each of these plates has an identical concave recess 18 which is designed to fit with a rail R (FIGURE 4). For rails having cross sections different than rail R, a concave recess 18 of a different shape should be cut.

A flange portion 20 in each concave recess 18 is designed to engage a portion of underside U of railhead H, adjacent web W of the rail section R (FIGURE 4). Slots 22 in plates 9 and 10 and slot 23 in plate 14 are located at the portions of the concave recesses designed to fit over the top of railhead H. When the plate 14 is positioned with respect to the plates 9 and 10 so that the slots 22 and 23 are aligned, the rail engaging portions 20 of each plate become positioned to engage the undersides U of railhead H, as shown in FIGURE 4.

A wedge member 24 is provided for insertion through aligned slots 22 and 23 in order to lock the body members 4 and 6 together. The opposite sides of wedge members 24 engage walls 22a and 23a (FIGURE 1) of slots 22 and 23 respectively and thus prevent relative rotation of the body members 4 and 6 in a direction outwardly from the rail R. Slots 22 and 23 also have walls 22b and 23b (FIGURE 1), but the engagement of these walls with wedge member 24 is not necessary to prevent rotation of the body members 4 and 6 toward the rail R, since the rail R itself accomplishes this function.

The wedge member 24 has a bottom edge 26 for sliding engagement with the top of railhead H. At the left-hand end of the wedge member 24 (FIGURE 3) is a head portion 28 with a concave surface 29 for engagement with a railcar wheel X (FIGURE 3). At the right-hand end of the wedge member 24 (FIGURE 3) is a tapered portion 30 with an upwardly facing, inclined wedge surface 32. As the tapered portion 30 is passed through slots 22 and 23 of body members 4 and 6, with its bottom edge 26 sliding on top of railhead H, the inclined wedge surface 32 pushes upwardly on the tops of the slots 22 and 23, thus lifting the body members 4 and 6 and pressing flanges 20 into engagement with underside U of railhead H.

For convenience in lifting and carrying the rail stop 2, the body member 6 is provided with a short bar 36 which is welded to plate 14. Also the wedge member 24 is connected by a chain 38 to the body member 4, so that the wedge member does not become separated from the body members 4 and 6 while the stop 2 is being stored or transported to and from the rail R.

In operation, the rail stop 2 is secured to the rail R by placing body member 4 in the position shown in FIGURE 4, while holding the body member 6 in its chain-line position 6' (FIGURE 4). The body member 6 is then rotated about hinge pin 8 to its solid line position of FIGURE 4. Slots 22 and 23 will thus be aligned, permitting tapered portion 30 of wedge member 24 to be slid through the continuous passageway formed by the aligned slots. The wedge member 24 is pushed by hand into the slots 22 and 23 as far as it will go. The stop 2 is then ready to stop railcar wheels approaching from either direction.

As shown in FIGURE 3, if a wheel X approaches from the left-hand side, it will strike concave surface 29 of wedge member 24 and drive the tapered portion 30 further through the slots 22 and 23. This will raise the flange portions 20 of tthe body members 4 and 6 into tighter engagement with the underside U of the railhead H.

The result is the same if a wheel Y approaches from the right-hand side of stop 2. The wheel Y hits the upper right corner of body member 4, thereby pushing the body members up the tapered portion 32 of wedge member 24. The flange portions 20 are again raised into tighter engagement with underside U of railhead H.

While one embodiment of my invention has been shown and described, modifications and adaptations of this railcar stop will be apparent while remaining within the scope of the appended claims.

I claim:
1. A railcar wheel stop for attachment to the head of a rail comprising
   (a) a body member having
      (1) a pair of rail engagement flanges for engaging the underside of said railhead on opposite sides of the web of said rail and
      (2) a continuous passageway extending parallel to said railhead when said flanges of the body member engage the railhead, and
   (b) a wedge member including
      (1) an edge surface for engagement with the top surface of said railhead
      (2) a head portion at one end adapted for engagement with a railcar wheel on said railhead and
      (3) a tapered portion at its other end designed to be passed through said continuous passageway in said body member,
         said tapered portion of said wedge member having an upwardly facing inclined surface converging toward said edge surface of the wedge member in a direction away from said head portion, whereby the forcing of the tapered portion into said continuous passageway through said body members will engage said inclined surface with the top wall of said continuous passageway and squeeze said raihead between said edge surface of said wedge member and said rail engagement flanges of said body member, and
         said body member extending upwardly from said railhead to such an extent that said body member will engage a railcar wheel coming from the side of said wheel stop opposite from the head portion of said wedge member before said railcar wheel engages any part of said wedge member, whereby said body member will be moved by said car wheel toward said head portion of said wedge member to cause said forcing of the tapered portion of said wedge member into said continuous passageway.

2. A railcar wheel stop for attachment to the head of a rail comprising
   (a) a pair of body members,
   (b) a hinge means connecting said body members so as to permit said body members to be rotated with respect to one another,
      each of said body members having a passageway extending through the body member in a direction substantially parallel to the axis of rotation of said hinge means, said passageways being placed so as to be capable of alignment to form a continuous passageway through both of said body members when said body members are rotated about said hinge means to a proper alignment position with portions of each body member overlapping one another,
   (c) a rail engagement flange on each of said body members placed so as to engage the underside of said railhead when said body members are in said proper alignment position, said flanges engaging said railhead on opposite sides of the web of said rail, and
   (d) a wedge member including
      (1) an edge surface for engagement with the top surface of said railhead,
      (2) a head portion at one end adapted for engagement with a railcar wheel on said railhead and
      (3) a tapered portion at its other end designed to be passed through said continuous passageway through both of said body members,
         said tapered portion having an upwardly facing inclined surface converging toward said edge surface of the wedge member in a direction away from said head portion, whereby the forcing of the tapered portion into said continuous passageway through said body members will engage said inclined surface with the top wall of said continuous passageway and squeeze said railhead between said edge surface of said wedge member and said rail engagement flanges of said body members, and
         one of said body members extending upwardly from said railhead to such an extent that said body member will engage a railcar wheel coming from the side of said wheel stop opposite from the head portion of said wedge member before said railcar wheel engages any part of said wedge member, whereby said body member will be moved by said car wheel toward said head portion of said wedge member to cause said forcing of the tapered portion of said wedge member into said continuous passageway.

3. The wheel stop of claim 2 wherein said passageway in each of said body members has side walls which constrain said wedge member when inserted in said passageway from lateral movement with respect to the body member, thereby preventing the relative rotation of said body members about said hinge means.

4. The wheel stop of claim 2 wherein
   one of said body members is divided into two spaced apart sections, the other body member fitting in between said sections when said body members are rotated to said proper alignment position, and the passageway in each of said body members has a side wall which constrains said wedge member when inserted in said passageway from lateral movement away from the rail engagement flange of said body member, thereby preventing said rail engagement flanges from being pulled away from each other by the relative rotation of said body members about said hinge means.

References Cited

UNITED STATES PATENTS

| 136,625 | 3/1873 | Stephenson | 104—258 |
| 2,807,220 | 9/1957 | McDowell | 104—258 |

ARTHUR L. LA POINT, *Primary Examiner*

D. F. WORTH, *Assistant Examiner.*